(12) United States Patent
Bremer et al.

(10) Patent No.: US 9,224,024 B2
(45) Date of Patent: Dec. 29, 2015

(54) INVARIANT DESIGN IMAGE CAPTURE DEVICE

(75) Inventors: Edward C. Bremer, Victor, NY (US); Chen Feng, Skaneateles Falls, NY (US)

(73) Assignee: Honeywell International, Inc., Fort Mill, SC (US)

( * ) Notice: Subject to any disclaimer, the term of this patent is extended or adjusted under 35 U.S.C. 154(b) by 37 days.

(21) Appl. No.: 13/294,791

(22) Filed: Nov. 11, 2011

(65) Prior Publication Data

US 2013/0119140 A1 May 16, 2013

(51) Int. Cl.
*G06K 7/10* (2006.01)
*G06F 7/10* (2006.01)

(52) U.S. Cl.
CPC ............. *G06K 7/10831* (2013.01); *G06F 7/10* (2013.01)

(58) Field of Classification Search
CPC .............................. G06K 7/10; G06K 7/10832
USPC ............. 235/472.01; 348/347, 240.99, 218.1, 348/262, 348, 274; 355/53
See application file for complete search history.

(56) References Cited

U.S. PATENT DOCUMENTS

| | | | |
|---|---|---|---|
| 4,560,862 A * | 12/1985 | Eastman et al. | 235/462.22 |
| 4,958,922 A * | 9/1990 | Binh et al. | 351/46 |
| 5,484,994 A * | 1/1996 | Roustaei | 235/462.25 |
| 5,537,166 A | 7/1996 | Keelan et al. | |
| 6,123,264 A * | 9/2000 | Li et al. | 235/472.01 |
| RE38,799 E | 9/2005 | Ning | |
| 7,025,271 B2 | 4/2006 | Dvorkis et al. | |
| 7,585,122 B2 | 9/2009 | Eromaki | |
| 7,816,650 B2 | 10/2010 | Garman et al. | |
| 8,027,095 B2 | 9/2011 | Havens | |
| 8,837,060 B2 * | 9/2014 | Lin et al. | 359/740 |
| 2004/0118918 A1 * | 6/2004 | Dvorkis et al. | 235/454 |
| 2005/0030498 A1 * | 2/2005 | Mulkens | 355/30 |
| 2005/0094002 A1 * | 5/2005 | Ohashi | 348/240.99 |
| 2007/0063048 A1 | 3/2007 | Havens et al. | |
| 2008/0239140 A1 * | 10/2008 | Vinogradov | 348/347 |
| 2008/0265035 A1 | 10/2008 | Vinogradov et al. | |
| 2011/0212751 A1 | 9/2011 | Havens et al. | |
| 2011/0290886 A1 * | 12/2011 | Carlson | 235/462.24 |

OTHER PUBLICATIONS

Optilux, Bringing Liquid Lens Technology to Camera Phones, http://optilux.com, dated Sep. 29, 2011 (4 pages).
Varioptic, The Liquid Lens Company/Arctic 416 (AF), http://www.varioptic.com/en/products/arctic-416-af.html, dated Sep. 20, 2011 (1 page).
W.F. Long, Apertures, 1992, pp. 1-5, http://www.drdrbill.com/downloads/optics/geometric-optics/Apertures.pdf.

* cited by examiner

*Primary Examiner* — Thien M Le
*Assistant Examiner* — Asifa Habib
(74) *Attorney, Agent, or Firm* — Additon, Higgins & Pendleton, P.A.

(57) ABSTRACT

An indicia reading terminal for reading of a decodable indicia is provided wherein the indicia reading terminal includes an image sensor integrated circuit comprising an image sensor having a plurality of pixels; a memory for storing image data, and a unit for processing the image data for attempting to decode decodable indicia represented in the image data; and an optical system, including a lens assembly and at least a first aperture and a second aperture, the second aperture being smaller than the first aperture. The lens assembly comprises one or more lens elements. The first aperture is disposed in the lens assembly, and the second aperture is disposed at a distal end of the optical system, adjacent to the lens assembly.

18 Claims, 5 Drawing Sheets

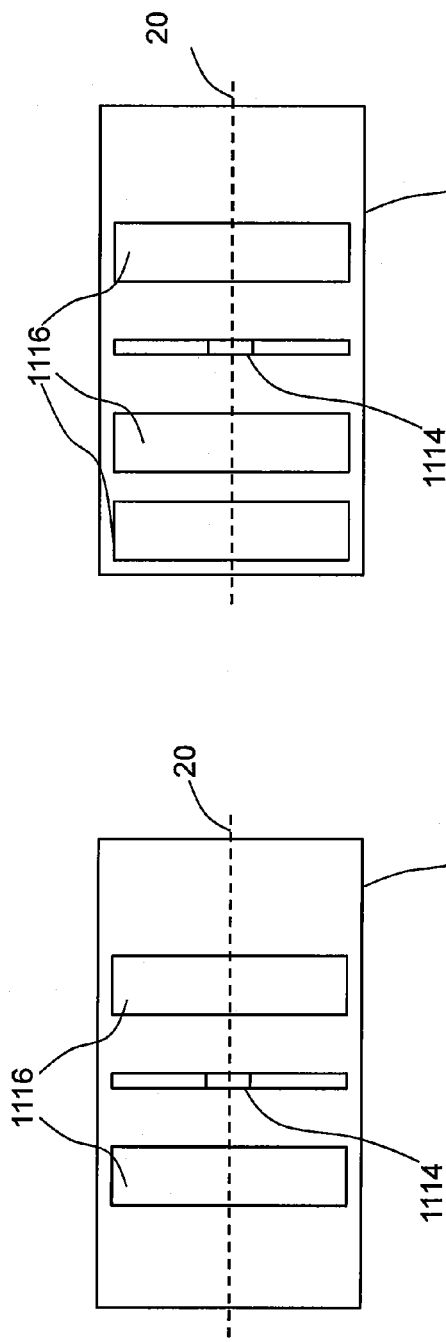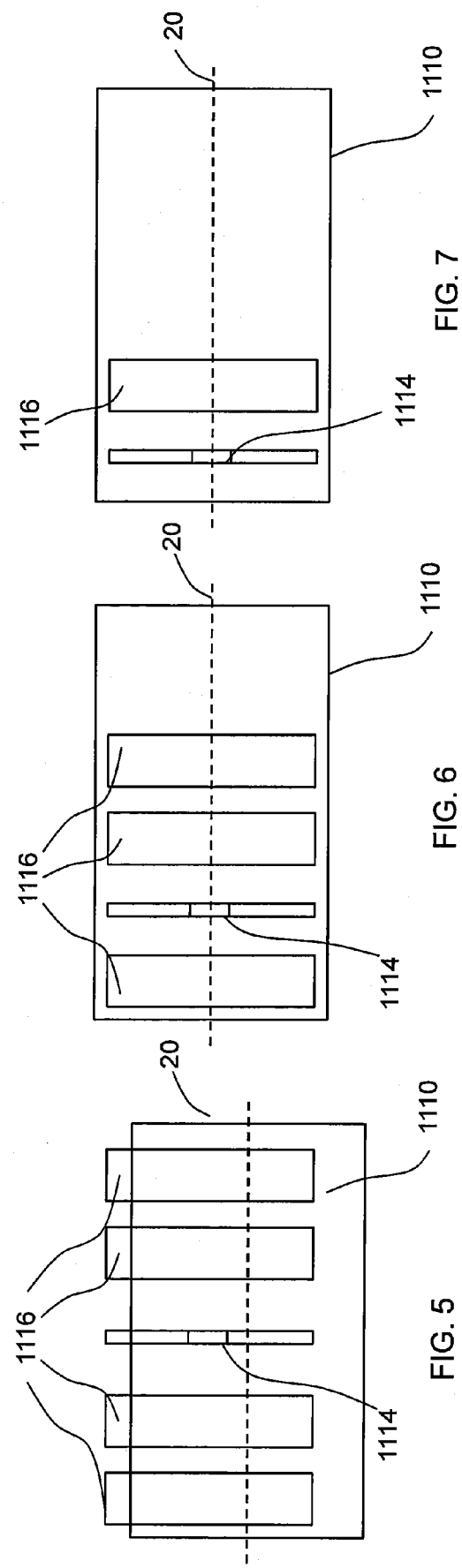

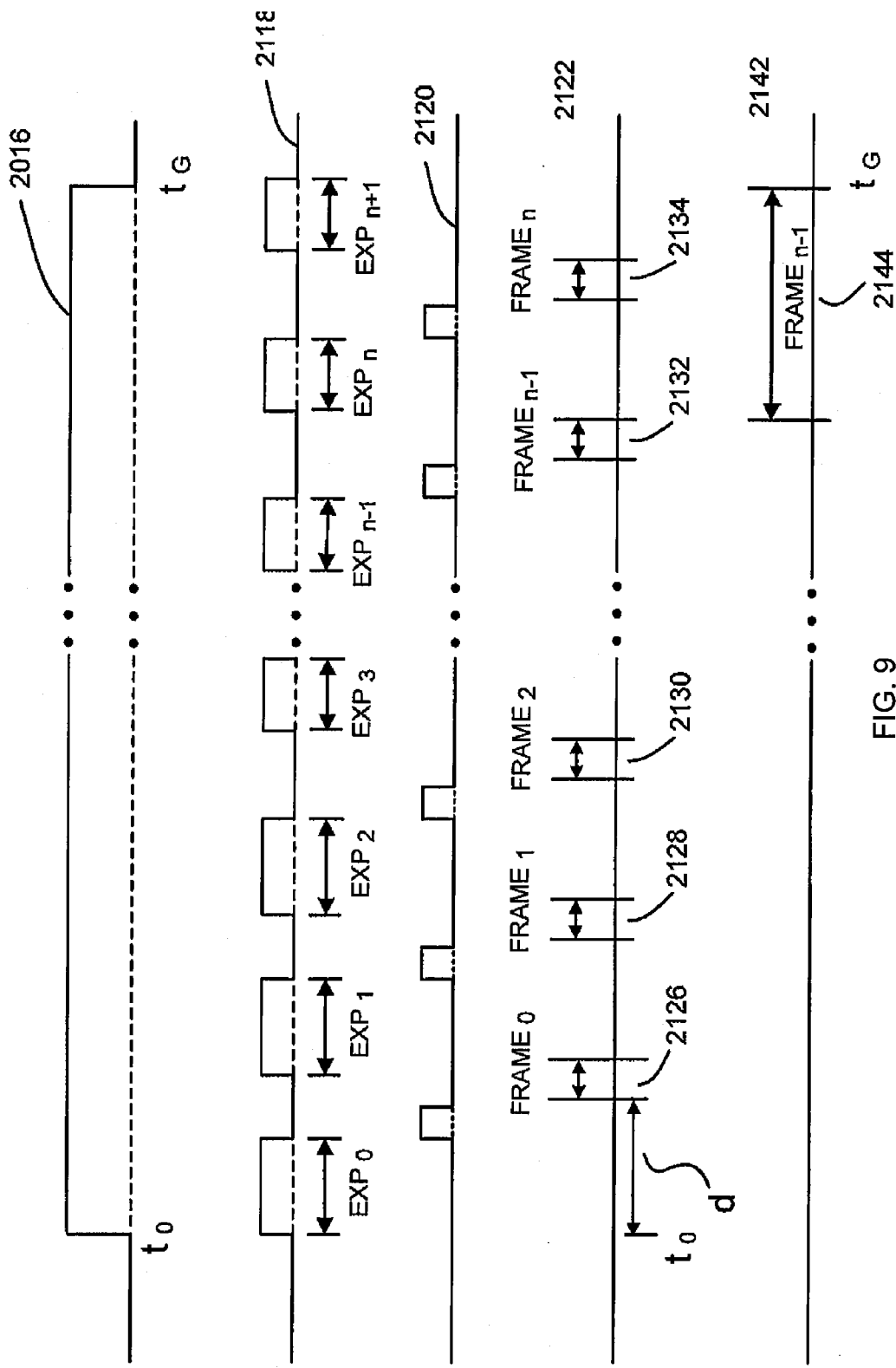

INVARIANT DESIGN IMAGE CAPTURE DEVICE

FIELD OF THE INVENTION

The invention relates to an indicial reading terminal for reading of a decodable indicia.

BACKGROUND OF THE INVENTION

Indicia reading apparatuses for reading decodable indicia are available in multiple varieties. For example, minimally featured indicia reading apparatus devoid of a keyboard and display are common in point of sale applications. Indicia reading apparatus devoid of a keyboard and display are available in the recognizable gun style form factor having a handle and trigger button (trigger) that can be actuated by an index finger. Indicia reading apparatuses having keyboards and displays are also available, often in a form where a keyboard and display is commonly located by the providing of a touch screen type display. Keyboard and display equipped indicia reading apparatuses are commonly used in retail, shipping and warehouse applications. In a keyboard and display equipped indicia reading apparatus, a trigger button for actuating the output of decoded messages is typically provided in such locations as to enable actuation by a thumb of an operator. Indicia reading apparatuses in a form devoid of a keyboard and display or in a keyboard and display equipped form are commonly used in a variety of data collection applications including retail point of sale applications, retail inventory applications, shipping applications, warehousing applications, security check point applications, patient care applications, and personal use, common where keyboard and display equipped indicia reading apparatus is provided by a personal mobile telephone having indicia reading functionality. Fixed mount indicia reading apparatuses are also commonly available, e.g., installed under or near a countertop at a point of sale. Some indicia reading apparatus are adapted to read bar code symbols including one or more of one dimensional (1D) bar codes, stacked 1D bar codes, and two dimensional (2D) bar codes. Other indicia reading apparatus are adapted to read OCR characters while still other indicia reading apparatus are equipped to read both bar code symbols and OCR characters.

SUMMARY OF THE INVENTION

An indicia reading terminal for reading of a decodable indicia is provided wherein the terminal includes an image sensor integrated circuit having an image sensor with a plurality of pixels, a memory for storing image data, and a unit for processing the image data for attempting to decode decodable indicia represented in the image data, and an optical system, including a lens assembly and at least a first and second aperture, the second aperture being smaller than the first aperture, wherein the lens assembly comprises one or more lens elements, the first aperture is disposed in the lens assembly, and the second aperture is disposed at a distal end of the optical system, adjacent to the lens assembly.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 3 is an embodiment of a lens assembly;

FIG. 4 is another embodiment of a lens assembly;

FIG. 5 is another embodiment of a lens assembly;

FIG. 6 is an embodiment of a lens assembly.

FIG. 7 is an embodiment of a lens assembly.

FIG. 9 is a timing diagram illustrating exemplary operation of an indicia reading terminal

DETAILED DESCRIPTION OF THE INVENTION

In the development of the indicia reading terminal of the present invention it was determined that desirable depths of field for indicia reading purposes can vary considerably from desirable depths of field associated with other image capture applications, for example, use in camera modules. Many fixed focus original equipment manufacturer (OEM) lens modules are crafted for such other image capture applications. Accordingly, in the development of the indicia reading terminal of the present invention it was determined that fixed focus OEM lens modules are generally constructed to accommodate needs that differ from those associated with indicia reading. For example, it was determined that modules may generally have a lens system with a relatively large f-stop of, for example, 2.4 to 2.8, which is beneficial for letting more light into a camera in which the lens module is employed. However, in the development of the indicia reading terminal of the present invention it was determined that the larger f-stop results in a reduced depth of field of the module, which can be unacceptable for indicia reading purposes. Thus, it was determined that many OEM lens modules cannot be satisfactorily employed in the art of indicia reading terminals (e.g., bar code readers).

Figure 1:
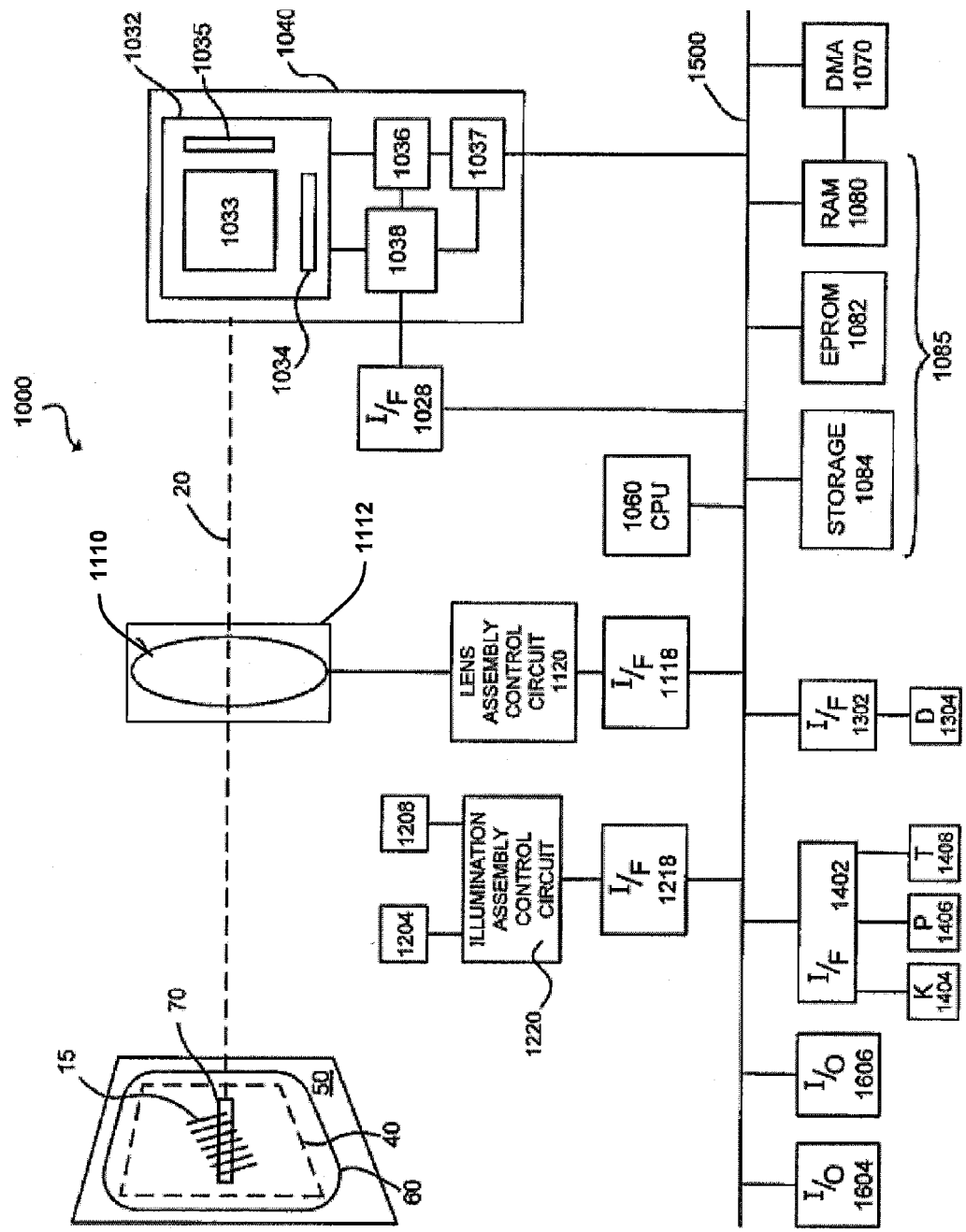
FIG. 1 is a block diagram illustrating an exemplary hardware platform of an indicia reading terminal described herein.

An exemplary hardware platform for an indicia reading terminal according to the instant invention is shown and described with reference to the block diagram of FIG. 1. Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one example, image sensor integrated circuit 1040 can be provided by an MT9V022 image sensor integrated circuit available from Micron Technology, Inc. In another example, image sensor integrated circuit 1040 can incorporate a Bayer pattern filter. In such an embodiment, CPU 1060 prior to subjecting a frame to further processing can interpolate pixel values intermediate of green pixel values for development of a monochrome frame of image data.

In the course of operation of terminal 1000 image signals can be read out of image sensor 1032, converted and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include central processing unit (CPU) 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, terminal 1000 can include an optical system 1112, which includes an imaging lens assembly 1110 for focusing an image of a decodable indicia located within a field of view 40 on a substrate 50 onto image sensor array 1033. Imaging light rays can be transmitted about imaging axis 20. Lens assembly 1110 includes a first aperture disposed about imaging axis 20. In some embodiments, lens assembly 1110 can be adapted to be capable of multiple focal lengths and multiple best focus distances.

Figure 2:
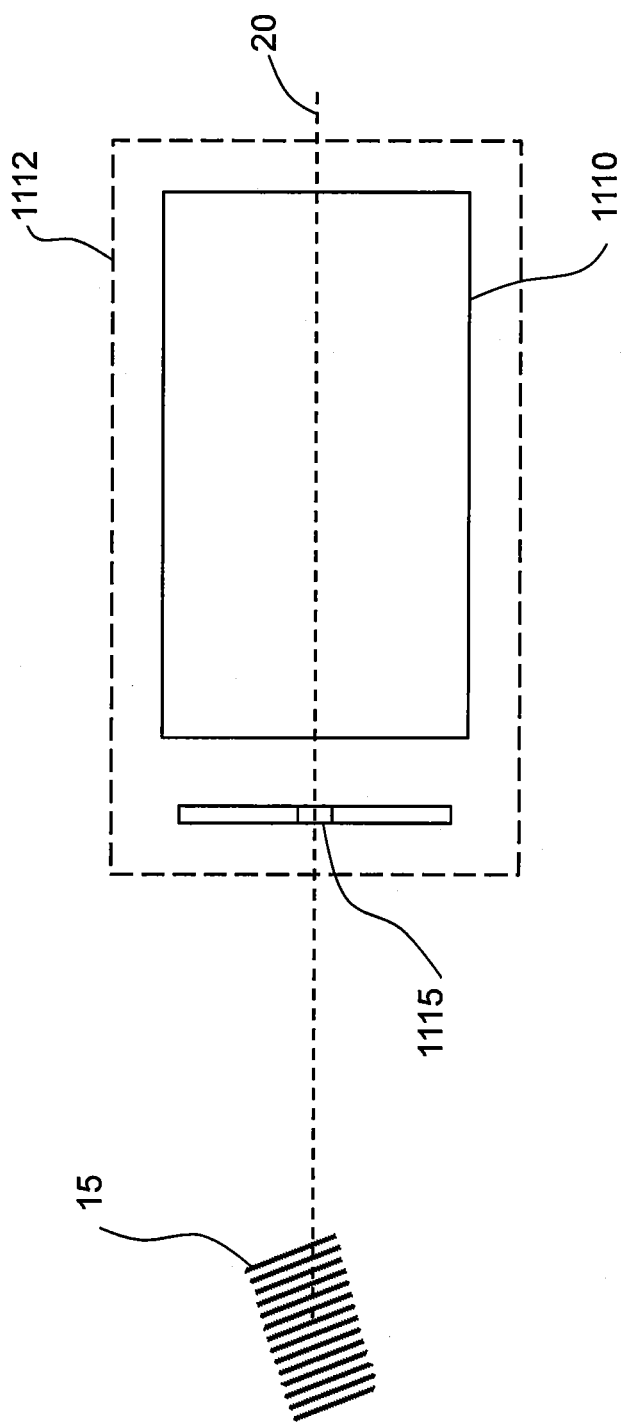
FIG. 2 is an embodiment of an optical system having a lens assembly and a second aperture.

FIG. 2 is an embodiment of optical system 1112. In the embodiment of FIG. 2, optical system 1112 comprises a second aperture 1115 disposed about imaging axis 20. Second aperture 1115 is disposed at a distal end of the optical system, adjacent to lens assembly 1110, which comprises a first aperture 1114 and one or more lens elements 1116. An optical system's f-stop expresses the diameter of the entrance pupil in terms of the focal length divided by the effective aperture diameter. Second aperture 1115 of terminal 1000 is smaller than first aperture 1114, thereby effectively reducing the effective aperture diameter and f-stop of the optical system of the indicia reading terminal, and enhancing the barcode reading depth of field. For example, many OEM camera lens modules have an f-stop of f/2.4 or f/2.8. In some embodiments, reading indicia terminal 1000 reduces the f-stop to f/3.0 or greater. For example, in certain embodiments, the indicia reading terminal of the present invention reduces the f-stop to f/4.0 or greater, for example, f/4.5 or more, or f/4.9 or more. In certain embodiments, the indicia reading terminal reduces the f-stop to f/5.0 or more, for example, f/5.5 or more, (e.g., f/5.6). In certain embodiments, the indicial reading terminal is configured such that that the terminal has an f-stop of f/4.8 to f/5.8. In addition to the functional benefits resulting from second aperture 1115, in some embodiments of the present indicia reading terminal, first aperture 1114 can also afford functional benefits, including, for example, reducing stray light and internal reflection within lens assembly 1110 and within terminal 1000.

Lens assembly 1110 includes first aperture 1114 and one or more lens elements 1116. FIGS. 3 to 7 illustrate several non-exhaustive embodiments of a lens assembly 1110, which can be used in optical system 1112. In the embodiment of FIG. 3, lens assembly 1110 includes first aperture 1114 disposed between two lens elements 1116. In the embodiment of FIG. 4, lens assembly 1110 includes first aperture 1114 disposed between three lens elements 1116, wherein two lens elements 1116 are disposed between first aperture 1114 and the distal end of the optical system facing second aperture 1115 and decodable indicia 15, and one lens element 1116 is disposed on the opposite side of first aperture 1114. In the embodiment of FIG. 5, lens assembly 1110 includes first aperture 1114, which is disposed between four lens elements 1116. In the embodiment of FIG. 6, lens assembly 1110 includes first aperture 1114 disposed between three lens elements 1116, wherein one lens element 1116 is disposed between first aperture 1114 and the distal end of the optical system facing second aperture 1115 and decodable indicia 15, and two lens elements 1116 are disposed on the opposite side of first aperture 1114. In the embodiment of FIG. 7, lens assembly 1110 includes first aperture 1114 disposed in front of lens elements 1116. In some embodiments, lens assembly 1110 may comprise one or more other additional optical elements known in the art, e.g., a focusing apparatus including a deformable fluid lens element, a focusing apparatus including an electrowetting fluid lens element, or a traditional non-deformable solid (e.g., glass, polycarbonate) lens element.

Returning to FIG. 1, terminal 1000 can also include a light source bank 1204 for generating an illumination pattern 60 substantially corresponding to a field of view 40 of terminal 1000 and an aiming pattern light source bank 1208 for generating an aiming pattern 70 on substrate 50. In use, terminal 1000 can be oriented by an operator with respect to a substrate 50 bearing decodable indicia 15 in such manner that aiming pattern 70 is projected on a decodable indicia 15. In the example of FIG. 1, decodable indicia 15 is provided by a 1D bar code symbol. Decodable indicia could also be provided by 2D bar code symbols or optical character recognition (OCR) characters. Each of illumination pattern light source bank 1204 and aiming pattern light source bank 1208 can include one or more light sources. Lens assembly 1110 can be controlled with use of lens assembly control circuit 1120 and the illumination assembly comprising light source bank 1204 and aiming pattern light source bank 1208 can be controlled with use of illumination assembly control circuit 1220. Lens assembly control circuit 1120 can send signals to lens assembly 1110 e.g., for changing a focal length and/or a best focus distance of lens assembly 1110. Illumination assembly control circuit 1220 can send signals to light source bank 1204 e.g., for changing a level of illumination output by light source bank 1204.

Terminal 1000 can also include a number of peripheral devices such as display 1304 for displaying such information as image frames captured with use of terminal 1000, keyboard 1404, pointing device 1406, and trigger 1408 which may be used to make active a trigger signal for activating frame readout and/or certain decoding processes. Terminal 1000 can be adapted so that activation of trigger 1408 activates a trigger signal and initiates a decode attempt.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1118 for coupling lens assembly control circuit 1120 to system bus 1500, interface circuit 1218 for coupling illumination assembly control circuit 1220 to system bus 1500, interface circuit 1302 for coupling display 1304 to system bus 1500, and interface circuit 1402 for coupling keyboard 1404, pointing device 1406, and trigger 1408 to system bus 1500.

In a further aspect, terminal 1000 can include one or more I/O interfaces 1604, 1606 for providing communication with external devices (e.g., a cash register server, a store server, an inventory facility server, a peer terminal 1000, a local area network base station, a cellular base station). I/O interfaces 1604, 1606 can be interfaces of any combination of known computer interfaces, e.g., Ethernet (IEEE 802.3), USB, IEEE 802.11, Bluetooth, CDMA, GSM.

Figure 8:
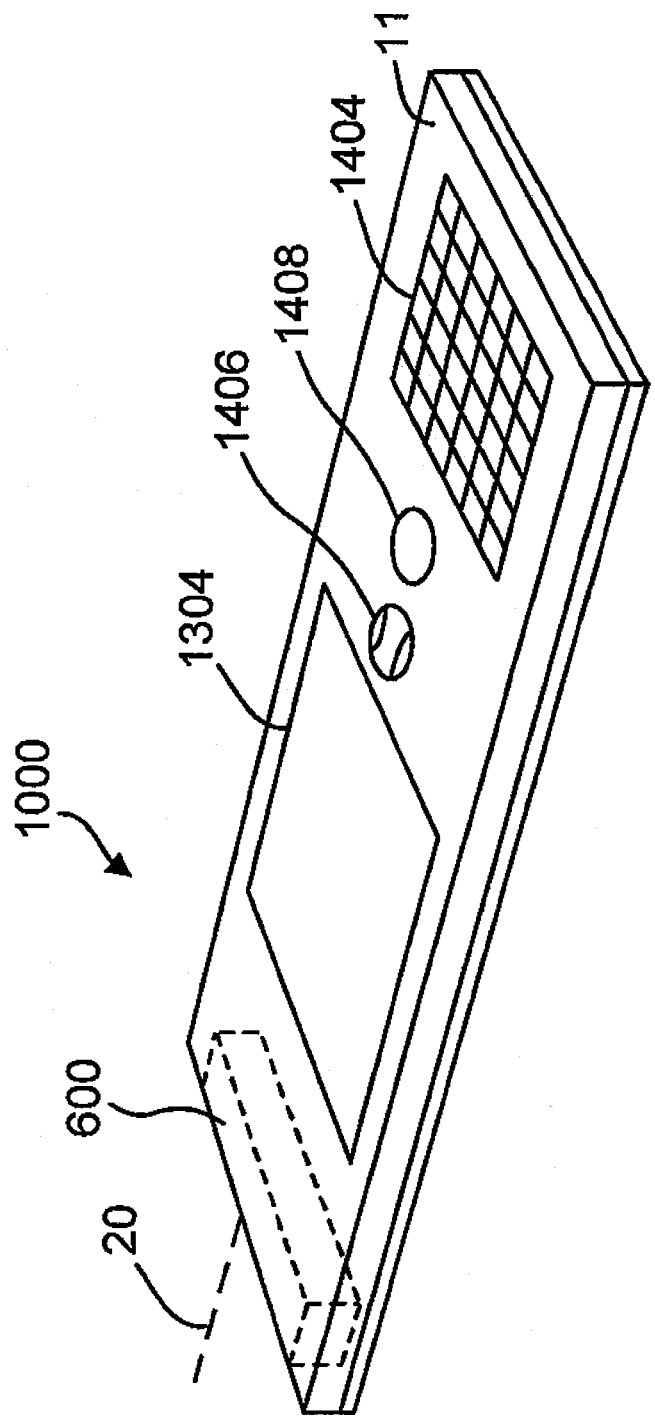
FIG. 8 is a physical form view of an embodiment of terminal 1000.

A physical form view of terminal 1000 in one embodiment is shown in FIG. 8. An imaging module 600 for supporting components of terminal 1000 can include image sensor integrated circuit 1040, which can be, for example, disposed on a printed circuit board together with illumination pattern light source bank 1204 and aiming pattern light source bank 1208. Imaging module 600 can also include a containment for image sensor integrated circuit 1040, and a housing for housing lens assembly 1110, and optionally optical system 1112. Imaging module 600 can be disposed in a hand held housing 11. Disposed on hand held housing 11 can be display 1304, trigger 1408, pointing device 1406, and keyboard 1404.

In one embodiment, the indicia reading terminal provides for fast capture of a frame of image data that can be processed for decoding. In one embodiment, the indicia reading terminal provides for a method of capturing a frame of image data, which method can be executed a number of times in succession (each time relative to a new frame in a succession of frames) in response to activation of a trigger signal until a frame is successfully decoded or until a time that a trigger signal is deactivated.

FIG. 9 is a timing diagram illustrating exemplary operation of an indicia reading terminal in processing image information for determining a location of a decodable indicia. In one embodiment, terminal 1000 can process image information for determining a location of decodable indicia by completing capturing of a frame of image data by storage of a frame into RAM 1080, where it is addressable by CPU 1060 and subjecting the stored frame of image data to processing. The timing diagram of FIG. 9 describes an exemplary method for capturing image data for processing by CPU 1060. At time $t_0$ trigger 1408 may be actuated to make active a trigger signal 2016 which may remain active until the earlier of trigger 1408 being released or a predetermined number of (e.g., 1) decodable indicia being successfully decoded (in the example of the timing diagram of FIG. 9, trigger signal 2016 is automatically deactivated at time, $t_G$, when an indicia representation is successfully decoded). Terminal 1000 can be adapted so that terminal 1000 continuously captures and processes a succession of frames for a time that trigger signal 2016 remains active. Terminal 1000 can be adapted so that in response to a trigger signal being made active, an exposure control timing pulse signal 2118 is applied to image sensor 1032 to expose pixels of image sensor array 1033. After a trigger signal is made active, there can be a succession of exposure periods $Exp_0$, $Exp_1$, $Exp_2$, $Exp_3$, ... each corresponding to a frame in a succession of frames, and each defined by a pulse of exposure control signal 2118.

Following each exposure period $Exp_0$, $Exp_1$, $Exp_2$, $Exp_3$ ... image information in the form of voltage signals can be read out from image sensor 1032. The readout of image information from image sensor 1032 can be in response to applications of readout control pulses of readout control signal 2120 as shown in the timing diagram of FIG. 9. Image information which has been subject to conversion by analog to digital converter 1037 can be routed into memory 1085 via DMA unit 1070 where it is available for processing by CPU 1060. Referring to the timing diagram of FIG. 9, time plot 2122 indicates the times within which CPU 1060 can process, for determining a location of a decodable indicia, a certain frame of image data out of a series of frames captured in response to activation of a trigger signal 2016. It is seen from time plot 2122 that processing by CPU 1060 for determining a location of a decodable indicia as part of block 100 can be carried out iteratively for each frame of a succession of frames. Because of processing delays, CPU 1060 may not commence processing an initial frame, $frame_0$, until during period 2126, a delay of time "d" after a trigger signal is made active at time $t_0$. Within processing periods 2126, 2128, 2130, 2132, 2134, CPU 1060 can carry out further processing with respect to a current frame, e.g., determining an imaging parameter.

A succession of frames of image data that can be captured and subject to the described processing can be full frames (including pixel values corresponding to more than about 80% of pixels of image sensor 1032). A succession of frames of image data that can be captured and subject to the described processing (e.g., context processing, parameter determination, decoding) can also be "windowed frames" comprising pixel values corresponding to less than about 80%, and in some cases less than about 50% and in some cases less than 10% of pixels of image sensor 1032. A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

CPU 1060, appropriately programmed can carry out a decoding process for attempting to decode a frame of image data. For attempting to decode, CPU 1060 can sample image data of a captured frame of image data along a sampling path, e.g., at a center of a frame, or a coordinate location determined to include a decodable indicia representation. In one example, a sampling path selected for executing a decode attempt can be a sampling path which for a previous frame was determined to intersect a decodable indicia representation. Next, CPU 1060 can perform a second derivative edge detection to detect edges. After completing edge detection, CPU 1060 can determine data indicating widths between edges. CPU 1060 can then search for start/stop character element sequences and if found, derive element sequence characters character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message. Where a decodable indicia representation is a 2D bar code symbology, a decode attempt can comprise the steps of locating a finder pattern using a feature detection algorithm, locating scan lines intersecting the finder pattern according to a predetermined relationship with the finder pattern, determining a pattern of dark and light cells along the scan lines, and converting each light pattern into a character or character string via table lookup.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

The invention claimed is:

1. An indicia reading terminal for reading of a decodable indicia, said indicia reading terminal comprising:
   an image sensor integrated circuit comprising an image sensor having a plurality of pixels;
   a memory for storing image data, and a processor for processing the image data for attempting to decode decodable indicia represented in the image data; and
   an optical system, comprising:
      a housing;
      a lens assembly within the housing comprising one or more lens elements and a first aperture; and
      a second aperture at a distal end of the optical system adjacent the housing of the lens assembly;
   wherein the first aperture and the second aperture are disposed along an imaging axis;
   wherein the second aperture is smaller than the first aperture; and
   wherein the optical system's distal end is away from the image sensor.

2. The indicia reading terminal of claim 1, wherein said terminal is configured such that the terminal has an f-stop of greater than f/4.0.

3. The indicia reading terminal of claim 2, wherein said terminal is configured such that the terminal has an f-stop of f/4.8 to f/5.8.

4. The indicia reading terminal of claim 1, wherein said lens assembly comprises two or more lens elements, and said first aperture is disposed between two lens elements of the same assembly.

5. The indicia reading terminal of claim 4, wherein said terminal is configured such that the terminal has an f-stop of greater than f/4.0.

6. The indicia reading terminal of claim 5, wherein said terminal is configured such that the terminal has an f-stop of f/4.8 to f/5.8.

7. The indicia reading terminal of claim 1, wherein said terminal is a hand held terminal having:
   a hand held housing encapsulating said integrated circuit, memory, unit for processing, and optical system; and
   a trigger disposed on said hand held housing for initiation of an indicia decode attempt.

8. The hand held indicia reading terminal of claim 7, wherein said terminal is configured such that the terminal has an f-stop of greater than f/4.0.

9. The hand held indicia reading terminal of claim 8, wherein said terminal is configured such that the terminal has an f-stop of f/4.8 to f/0.8.

10. The hand held indicia reading terminal of claim 7, wherein said lens assembly comprises two or more lens elements, and said first aperture is disposed between two lens elements of the assembly.

11. The hand held indicia reading terminal of claim 10, wherein said terminal is configured such that the terminal has an f-stop of greater than f/4.0.

12. The hand held indicia reading terminal of claim 11, wherein said terminal is configured such that the terminal has an f-stop of f/4.8 to f/0.8.

13. An indicia reading terminal, comprising:
   an image sensor integrated circuit comprising an image sensor;
   a memory for storing image data generated by the image sensor;
   a processor for processing the image data for attempting to decode decodable indicia represented in the image data; and
   an optical system comprising:
      a housing;
      a lens assembly within the housing comprising one or more lens elements;
      a first aperture disposed in the lens assembly; and
      a second aperture that is smaller than the first aperture,
   wherein the lens assembly, the first aperture, and the second aperture are disposed along an imaging axis;
   wherein the first aperture is disposed between the image sensor and the second aperture;
   wherein the second aperture is disposed at a distal end of the optical system away from the image sensor; and
   wherein the second aperture is adjacent to the housing.

14. The indicia reading terminal of claim 13, wherein the terminal is configured such that the terminal has an f-stop of greater than f/4.0.

15. The indicia reading terminal of claim 14, wherein the terminal is configured such that the terminal has an f-stop of f/4.8 to f/5.8.

16. The indicia reading terminal of claim 13, wherein the lens assembly comprises two or more lens elements, and the first aperture is disposed between two lens elements of the same assembly.

17. The indicia reading terminal of claim 16, wherein the terminal is configured such that the terminal has an f-stop of greater than f/4.0.

18. The indicia reading terminal of claim 17, wherein the terminal is configured such that the terminal has an f-stop of f/4.8 to f/5.8.

* * * * *